W. MALONEY.
ELEVATED RAILWAY.
APPLICATION FILED JUNE 12, 1911.
1,019,331.
Patented Mar. 5, 1912.
2 SHEETS—SHEET 2.
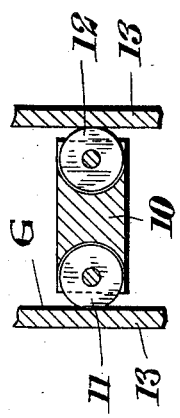
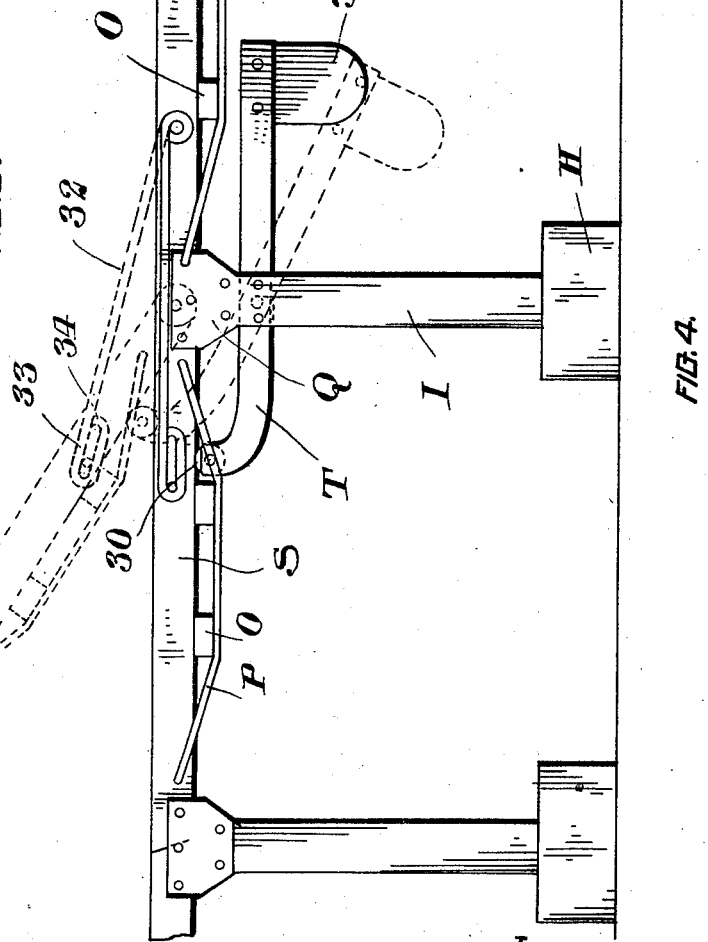
WITNESSES
INVENTOR
W. MALONEY.
BY
ATT'Y.

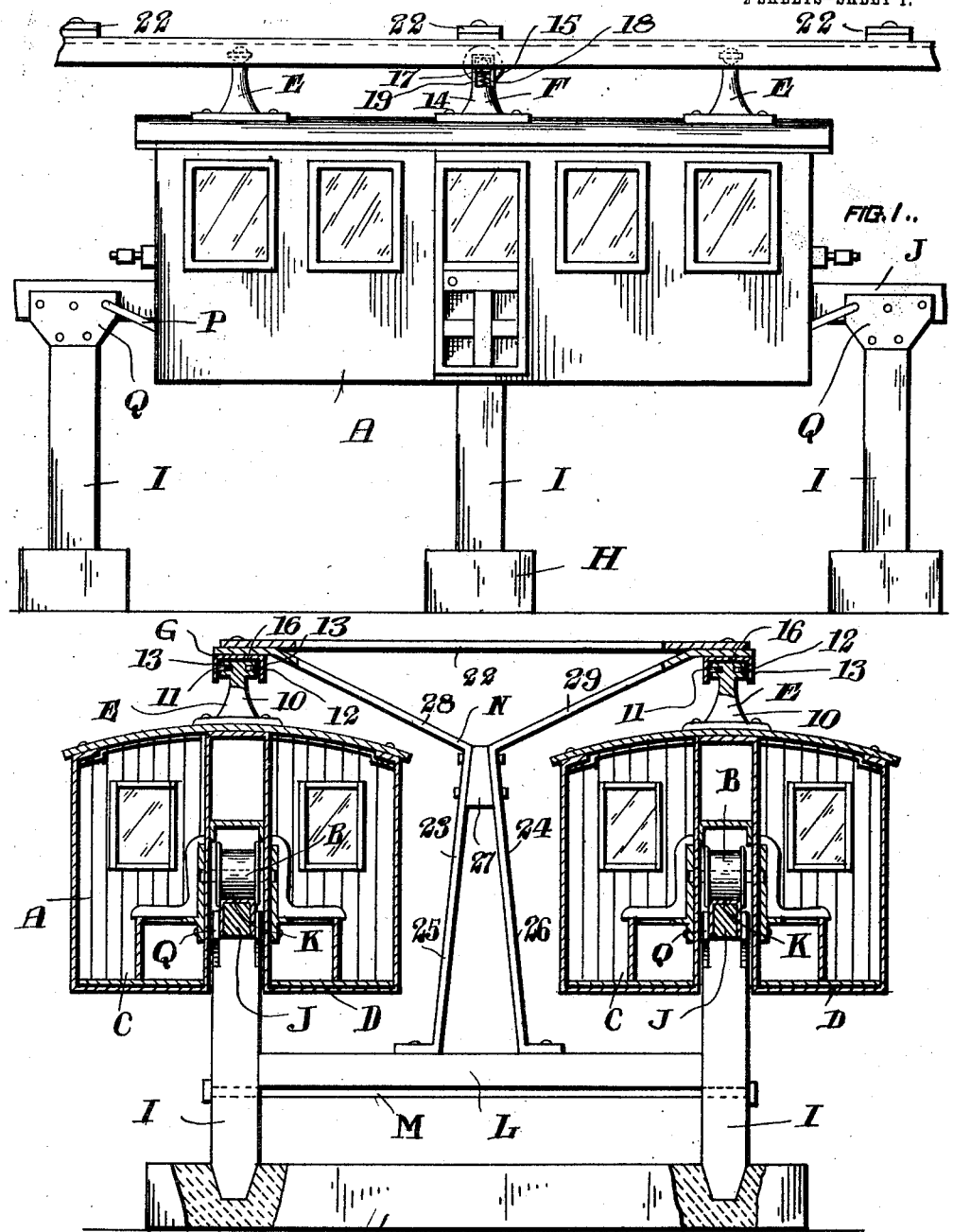

UNITED STATES PATENT OFFICE.

WILLIAM MALONEY, OF OTTAWA, ONTARIO, CANADA.

ELEVATED RAILWAY.

1,019,331.  Specification of Letters Patent.  Patented Mar. 5, 1912.

Application filed June 12, 1911. Serial No. 632,719.

*To all whom it may concern:*

Be it known that I, WILLIAM MALONEY, of 221 Somerset street east, in the city of Ottawa, county of Carleton, Province of Ontario, Dominion of Canada, have invented certain new and useful Improvements in Elevated Railways, of which the following is a specification.

This invention relates to improvements in elevated railways and particularly to those of the type in which the cars run on a single rail and the objects of the invention are to provide improved means for steadying the cars against lateral swinging and vertical movement while they are in motion.

Further objects are to provide an improved form of double track construction in which the desired degree of rigidity will be given to both the supporting and steadying tracks.

Further objects still are to provide a form of track construction which may be built very rapidly and at low cost thus adapting the system for use in isolated location and under circumstances where extremely rapid construction is necessary.

Further objects still are to provide improved means for permitting raising of the track over a road to allow passage of vehicles on the road.

In its construction the invention includes cars formed with central supporting wheels and overhanging sections, the cars having overhead steadying devices including wheels adapted to bear on the side flanges of an overhead track and other wheels adapted to run on the track itself.

The double track construction which it is preferable to use comprises base members having spaced standards which support the rails, said standards being connected by a cross bar which supports a T-shaped bracket member the arms of which carry U-shaped steadying rails, all as hereinafter more fully set forth and described in the accompanying specification and drawings.

In the drawings: Figure 1 is a side view of a car and portion of track embodying the present invention. Fig. 2 is a cross sectional view. Fig. 3 is a sectional detail through one of the steadying elements. Fig. 4 is a side view of the arrangement for permitting raising of the track at a crossing.

In the drawings like characters of reference indicate corresponding parts in each figure.

Referring to the drawings, A represents a car and it will be appreciated that in the complete system a number of cars may be connected together and drawn or driven from the engine or car containing the motive power, which motive power may be derived from a steam engine, internal combustion engine or electrical motor. In the latter case the supporting and steadying tracks will hereinafter referred to will conveniently form conductors for supplying the electric current. The car is formed with central supporting wheels B and overhanging side sections C and D, the supporting wheels being located slightly above the center of gravity of the car whereby there will be no tendency of the car to over-balance sidewise. The top of the car is formed with overhead steadying devices E, E and F. The steadying devices E comprise bracket members 10 which support rollers 11 and 12 adapted to run on the side flanges 13, 13 of the overhead track G, the rollers being thus adapted to steady the car against lateral swinging. The steadying device F includes a bracket member 14 and a roller 15 adapted to run on the bottom 16 of the rail, the roller being desirably resiliently held in position. As illustrated the axle of the roller is supported in bearing blocks 17 mounted in a guideway 18 and forced toward the rail by a spring or springs 19.

In constructing a double track in accordance with the present invention transversely extending base members H are provided which may be conveniently formed of concrete, reinforced or otherwise. These base members have standards I, I set therein, the top of which standards carry longitudinally extending rails J, J. As illustrated the standards and rails are formed of wood, the sides and top surfaces of the rails being covered by U-shaped tracks K, K. The standards I, I are connected a short distance above the base members by a cross bar L below which a tie rod M extends. The cross bar L supports a T-shaped bracket member N the arms of which carry the overhead steadying tracks G, G. The T shaped bracket member N comprises a top transversely extending section 22 and side sections 23 and 24; the legs 25 and 26 of which diverge from each other and are connected at their upper extremities by suitable bolts which extend therethrough and also through a spacing block 27. The upper portions 28 and 29 of the side sections 23 and 24 are slightly upwardly inclined so as to more effectually support the top section 22. To give additional support to the track cross bars O are provided beneath both rails intermediate of the distance between the standards, said cross bars being supported by tie rods P which extend beneath opposite ends of the same, the extremities of the tie rods being connected to plates Q on the top of the standards which plates also serve to connect the standards with the rails.

Referring now to Fig. 4 which shows the arrangement for crossing a road, S represents the section of track which is adapted to extend over the road and which is pivotally supported from the bar or standards I which are at the side of the road. The section is counterbalanced so that it may be readily swung upwardly, the counterbalancing in the embodiment illustrated comprising a lever T which is pivoted intermediate of its length near the top of the standard I, one end of the lever having a roller 30 which bears on the under side of the sections while the other side has a counterbalanced weight 31. Upward movement of the section may be limited by a link 32 which has one end pivoted to the track and has an elongated eye 33 on the opposite end which fits over a pin 34 on the section S. It will be seen that if the section were raised and a train or car came along the weight of the train or car being on the upper side of the section would swing it to a horizontal position and permit free passage of the car.

As many changes could be made in the above construction and many apparently widely different embodiments of my invention, within the scope of the claims, constructed without departing from the spirit or scope thereof, it is intended that all matter contained in the accompanying specification and drawings shall be interpreted as illustrative and not in a limiting sense.

What I claim as my invention is:—

1. In combination a supporting track, a car thereon, an over-head track of inverted U shape, a steadying device on the car including rollers adapted to run on the inner surface of the side flanges of the overhead track.

2. In combination base members, standards supported thereon, cross bars connecting the standards, rails carried by the standards and T-shaped bracket members mounted on the cross bars and overhead rails carried by the extremities of the brackets and having depending side flanges, a car mounted on the first mentioned rail having steadying means extending between the depending flanges aforesaid.

3. In combination base members, steadying rails supported therefrom, T-shaped bracket members supported from the base members, overhead rails carried by the bracket members having depending flanges, a car mounted on the supporting rails having steadying means to engage with said flanges.

In witness whereof I have hereunto set my hand in the presence of two witnesses.

WILLIAM MALONEY.

Witnesses:
RUSSEL S. SMART,
WM. A. UZMAN.